United States Patent Office  
3,029,254  
Patented Apr. 10, 1962

3,029,254
STABILIZED SATURATED CYCLIC ETHER COMPOSITIONS
Hugh C. Campbell, Wilmington, Del., assignor to E. I. du Pont de Nemours and Company, Wilmington, Del., a corporation of Delaware
No Drawing. Filed Nov. 20, 1959, Ser. No. 854,237
3 Claims. (Cl. 260—345.1)

This invention relates to the stabilization of cyclic ethers, particularly saturated cyclic ethers and more particularly to the stabilization of tetrahydrofuran.

Tetrahydrofuran and related compounds are susceptible to oxidation and have a tendency to form peroxides. Peroxides are especially undesirable because if permitted to increase to high concentrations, the material can become too unsafe for handling. Peroxides usually form under storage conditions when the ether is in contact with air. Additional peroxide formation can occur when the ether is used and exposed to light and air. In order to prevent the peroxide from exceeding safe limits, it is necessary to employ stabilizers or antioxidants that either destroy the peroxide, inhibit its formation, or both.

Known antioxidants are frequently unsuitable either because they fail to suppress peroxide formation to a sufficiently low level or because they cause discoloration or otherwise render the ether unsuitable for many industrial applications. Many known antioxidants are also unacceptable because of toxicity.

It is an object of the present invention to provide saturated cyclic ether compositions that are effectively stabilized against peroxide formation.

It is another object of the present invention to provide stabilized saturated cyclic ether compositions that contain essentially non-toxic stabilizers.

It is still another object of the present invention to provide stabilized saturated cyclic ether compositions that are substantially colorless.

It is a further object of the present invention to provide a method of effectively stabilizing saturated cyclic ethers.

These and other objects will be apparent from the following description.

Stabilization of tetrahydrofuran is accomplished using a compound of the formula

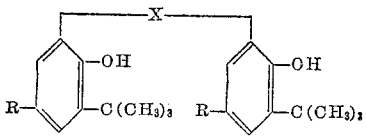

where X is $CH_2$ or S and R is a lower alkyl having 1 to 3 carbon atoms. Preferred stabilizers are those compounds of the above formula wherein X is $CH_2$. Especially preferred is 2,2'-methylene-bis-(4-methyl-6-tertiary butyl phenol).

Tetrahydrofuran and other saturated cyclic ethers, specifically methyl tetrahydrofuran and tetrahydropyran, are stabilized by the above compounds in accordance with the present invention. The amount of stabilizer used will usually comprise less than 1% by weight of the composition, although more than 1% can be used. A preferred amount of stabilizer is 0.005% to 0.1% by weight, but less than 0.005% is suitable for many applications. For instance, tetrahydrofuran containing less than 600 p.p.m. peroxide is considered suitable in practically all applications but some industrial applications, such as coating applications where materials are coated with a film of polyvinyl chloride using the ether as a solvent, will tolerate higher amounts of peroxide concentrations. Thus the amount of stabilizer to be used will depend on the magnitude of effect desired.

The following compounds within the scope of the above formula were used.

Compound 1: 2,2'-thiobis-(4-methyl - 6 - tertiary butyl phenol);
Compound 2: 2,2'-methylene-bis-(4-methyl-6 - tertiary butyl phenol); and
Compound 3: 2,2'-methylene-bis-(4 - ethyl - 6 - tertiary butyl phenol).

Four Erlenmeyer flasks each containing 100 ml. of tetrahydrofuran were fitted with stoppers vented with capillary tubes. The tetrahydrofuran in flasks 1 and 2 had a low peroxide content (less than 50 p.p.m.), but the sample in No. 3 flask had remained unstabilized for two days before the stabilizer was added. Thus the effectiveness of this stabilizer can be assessed by considering the gain in peroxide content after the initial test on the seventh day. Each of the above three stabilizers was tested separately in flasks Nos. 1 to 3 respectively; flask No. 4 was used as a control and contained no stabilizer. All flasks were constantly subjected to the influence of light and air at room temperature.

| Stabilizer, 0.1% Wt. | Tetrahydrofuran Peroxide (p.p.m.) | | | | |
|---|---|---|---|---|---|
| | 7 Days | 14 Days | 35 Days | 49 Days | 63 Days |
| 1 | 60 | 405 | 345 | 405 | |
| 2 | 185 | 350 | 345 | 230 | |
| 3 | 575 | 575 | 575 | 690 | 690 |
| None | 2,200 | 5,800 | 19,150 | Discontinued | |

In the above tests, flasks 1 and 2 were not examined on the 63rd day, but after 77 days flasks Nos. 1 and 2 contained only 575 and 520 p.p.m. peroxide, respectively.

The results obtained from the above experiments indicate that compounds 1 to 3 are superior stabilizers. Compounds 1 and 2 were further examined at a concentration of 0.1% by weight by exposing them to light and air at a constant temperature of 25° C. The compounds were added to tetrahydrofuran in vented Erlenmeyer flasks as noted in the first experiment, except the stabilizers were added shortly after receiving tetrahydrofuran having a very low peroxide content (less than 50 p.p.m.). Peroxide content was determined periodically. After four weeks the peroxide content in the sample stabilized by compound 1 was 175 p.p.m.; the sample containing stabilizer 2 was 115 p.p.m. The peroxide content of the unstabilized control sample was found to be 16,150 p.p.m.

Compound No. 2 was further examined at concentrations of 0.01%, 0.05% and 0.1% by weight under the same conditions and in the same manner as noted in connection with the first experiment. The tetrahydrofuran used had an original peroxide content of less than 50 p.p.m. and the stabilizer was added shortly after removing the ether from an inert atmosphere.

| Compound No. 2 | Tetrahydrofuran Peroxide (p.p.m.) | | | |
|---|---|---|---|---|
| | 7 Days | 21 Days | 56 Days | 91 Days |
| 0.1% | 45 | 45 | 70 | 90 |
| 0.05% | 60 | 45 | 80 | 105 |
| 0.01% | 60 | 70 | 185 | 310 |
| Unstabilized Control | 4,650 | 14,400 | Discontinued | |

From the experiments, it is apparent that 2,2'-methylene-bis-(4-methyl-6-tertiary butyl phenol) is a remarkably effective stabilizer and that its related compounds are also very effective. All of the compounds tested are non-toxic and compatible with tetrahydrofuran. From the standpoint of discoloration, all samples tested remained substantially colorless, although 2,2'-methylene-bis-(4-methyl-6-tertiary butyl phenol) was superior in this respect.

The embodiments of the invention in which an exclusive property or privilege is claimed are defined as follows.

1. A stabilized composition consisting essentially of saturated cyclic ether selected from the group consisting of tetrahydrofuran, methyl tetrahydrofuran, and tetrahydropyran and about 0.005–1% by weight of a compound of the formula

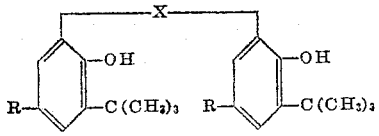

where X is selected from the group consisting of $CH_2$ and S and R is a lower alkyl having 1 to 3 carbon atoms.

2. A stabilized composition consisting essentially of saturated cyclic ether selected from the group consisting of tetrahydrofuran, methyl tetrahydrofuran, and tetrahydropyran and about 0.005–1% by weight of 2,2'-methylene-bis-(4-methyl-6-tertiary butyl phenol).

3. A stabilized composition consisting essentially of saturated cyclic ether selected from the group consisting of tetrahydrofuran, methyl tetrahydrofuran, and tetrahydropyran and about 0.005–1% by weight of 2,2'-thio-bis-(4-methyl-6-tertiary butyl phenol).

References Cited in the file of this patent
UNITED STATES PATENTS
2,675,366    Pullman _____ Apr. 13, 1954
OTHER REFERENCES
Thompson et al.: Ind. and Eng. Chem., vol. 42 (1950), pp. 922–925.
Katsui et al.: Chemical Abstracts, vol. 51 (1957), col. 15,887–8.